(12) United States Patent
Akhmad

(10) Patent No.: US 10,087,039 B2
(45) Date of Patent: Oct. 2, 2018

(54) SURVEILLANCE APPARATUS

(71) Applicant: BAE SYSTEMS plc, London (GB)

(72) Inventor: Mohammed-Asif Akhmad, Great Baddow (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 15/514,245

(22) PCT Filed: Sep. 24, 2015

(86) PCT No.: PCT/GB2015/052762
§ 371 (c)(1),
(2) Date: Mar. 24, 2017

(87) PCT Pub. No.: WO2016/046552
PCT Pub. Date: Mar. 31, 2016

(65) Prior Publication Data
US 2017/0291791 A1    Oct. 12, 2017

(30) Foreign Application Priority Data

Sep. 25, 2014  (GB) .................................. 1416926.2

(51) Int. Cl.
*G03B 17/00*  (2006.01)
*B65H 75/44*  (2006.01)
(Continued)

(52) U.S. Cl.
CPC ....... *B65H 75/4431* (2013.01); *F16M 11/046* (2013.01); *F16M 11/18* (2013.01); *F16M 11/40* (2013.01); *G03B 17/561* (2013.01)

(58) Field of Classification Search
USPC .................... 396/427, 25; 348/144, 158, 159
See application file for complete search history.

(56) References Cited

U.S. PATENT DOCUMENTS 3,319,987 A    5/1967  Bohr et al.
6,112,474 A    9/2000  Paine
(Continued)

FOREIGN PATENT DOCUMENTS

DE    29819849 U1    5/1999
EP     1863153 A2   12/2007
(Continued)

OTHER PUBLICATIONS

International Search Report and Written Opinion received for Patent Application No. PCT/GB2015/052761, dated Dec. 23, 2015. 10 pages.
(Continued)

*Primary Examiner* — Clayton E Laballe
*Assistant Examiner* — Warren K Fenwick
(74) *Attorney, Agent, or Firm* — Finch & Maloney PLLC

(57) ABSTRACT

A surveillance apparatus includes a retractable support member; a housing; a spooling mechanism mounted at the housing, and being rotatable relative to the housing, and being attached to a second end of the retractable support member. The spooling mechanism is operable to rotate in a first direction to convert the retractable support member from a coiled condition to an extended condition and thereby pay-out the support member from the housing, and operable to rotate in a second direction opposite to the first to convert the retractable support member from the extended condition to the coiled condition and thereby retract the support member into the housing. A mount is attached to a first end of the retractable support member; a surveillance device is attached to the mount.

20 Claims, 4 Drawing Sheets

(51) Int. Cl.
*F16M 11/04* (2006.01)
*F16M 11/18* (2006.01)
*F16M 11/40* (2006.01)
*G03B 17/56* (2006.01)

(56) References Cited

U.S. PATENT DOCUMENTS

| | | | | |
|---|---|---|---|---|
| 2002/0180866 | A1* | 12/2002 | Monroe | G01B 11/00 |
| | | | | 348/135 |
| 2003/0160892 | A1 | 8/2003 | Tamura | |
| 2006/0261207 | A1* | 11/2006 | Woodruff | E04H 12/185 |
| | | | | 242/473.3 |
| 2009/0003822 | A1 | 1/2009 | Tyner | |
| 2009/0256584 | A1 | 10/2009 | Moser et al. | |
| 2011/0012003 | A1 | 1/2011 | Woodruff et al. | |
| 2011/0243551 | A1 | 10/2011 | Young et al. | |
| 2012/0112008 | A1* | 5/2012 | Holifield | B64C 27/02 |
| | | | | 244/155 A |
| 2012/0318187 | A1* | 12/2012 | Condit | G21C 17/013 |
| | | | | 114/313 |
| 2013/0233964 | A1* | 9/2013 | Woodworth | B64C 37/02 |
| | | | | 244/2 |
| 2014/0284531 | A1* | 9/2014 | Hoyt | B66D 1/38 |
| | | | | 254/385 |
| 2017/0302890 | A1* | 10/2017 | Akhmad | H04N 7/183 |

FOREIGN PATENT DOCUMENTS

| | | |
|---|---|---|
| GB | 2474246 A | 4/2011 |
| NL | 1022062 | 6/2004 |
| WO | 2011000092 A1 | 1/2011 |
| WO | 2016046551 A1 | 3/2016 |
| WO | 2016046552 A1 | 3/2016 |

OTHER PUBLICATIONS

International Search Report and Written Opinion received for Patent Application No. PCT/GB2015/052762, dated Jan. 4, 2016, 12 pages.

GB Intellectual Property Office Search Report under Section 17(5) received for GB Patent Application No. 1416927.0 dated Mar. 17, 2015. 2 pages.

GB Intellectual Property Office Search Report under Section 17(5) received for GB Patent Application No. 1416926.2 dated Feb. 23, 2015. 3 pages.

International Preliminary Report on Patentability received for Patent Application No. PCT/GB2015/052762, dated Apr. 6, 2017. 8 pages.

International Preliminary Report on Patentability received for Patent Application No. PCT/GB2015/052761, dated Apr. 6, 2017. 7 pages.

* cited by examiner

SURVEILLANCE APPARATUS

The present invention relates to surveillance apparatus.

It is known to provide a retractable support for attachment to an imaging device such as a digital camera, for capturing images of a scene or a video of a scene. Such supports enable the operator to capture images or video from viewpoints which may not be possible in the absence of such a support.

Often such supports have a telescopic mechanism for enabling the support to switch between a compressed and an extended condition. As such the supports include a retractable member comprising a series of coaxial tubular sub-members, each having decreasing girth compared to the preceding sub-member, and interconnected such that smaller girth sub-members may be sheathed inside their larger girth neighbours. Typically such supports can extend to a length of approximately one meter.

According to the present invention there is provided a surveillance apparatus comprising:—a retractable support member the member having a first end and a second end; a housing; a spooling mechanism mounted at the housing, and being rotatable relative to the housing, and being attached to the second end of the retractable support member, the spooling mechanism being: operable to rotate in a first direction to convert the retractable support member from a coiled condition to an extended condition and thereby pay-out the support member from the housing, operable to rotate in a second direction opposite to the first to convert the retractable support member from the extended condition to the coiled condition and thereby retract the support member into the housing; a mount attached to the first end of the retractable support member; a surveillance device attached to the mount for receiving environmental signals, a human interface remote from the surveillance device; and a signal interface for relaying the signals received at the surveillance device to the human interface, such that the surveillance device may be supported, remote from the human interface by paying out the member, and wherein the signal interface comprises a transmitter at the surveillance device for sending an first electromagnetic signal; and the human interface comprises a receiver for receiving the first electromagnetic signal.

Such a surveillance apparatus can tend to provide a lightweight support which offers the operator the option of using the surveillance device at a number of different displacements from the housing, and yet still provides for efficient stowage.

The retractable support member may be in the form of a cambered tape.

Such a support member has been determined to provide efficient use of material in supporting the load of the surveillance device for low weight per unit length.

The spooling mechanism may comprise a spring biased to retract the support member and wherein the surveillance apparatus further comprises a selectively applicable brake for locking the member in position when a desired amount of retractable support member has been converted into an extended condition.

Such a spooling mechanism can tend to be convenient to operate. Further, the retraction of the support member, i.e. the tape, can be completed quickly by releasing the brake and allowing the spooling mechanism to retract the extended portion of the support member, as urged by the spring.

Typically the human interface is at the housing.

The surveillance device may be a camera, and the human interface may be a display screen.

As such the operator may monitor the output of the surveillance device remote from the surveillance device, either at the housing, or may be even on a non-contiguous human interface such as a separate tablet computer, which may be viewed by another operator.

The display screen may be pivotally attached at the housing in at least one axis, such that the display screen may switch between a readily observable condition and a stowed condition.

As such convenient viewing of the display screen can be achieved.

The electromagnetic signal may be a radio frequency signal having a frequency between 55 GHz and 65 GHz.

Such frequencies can provide a relatively covert and secure wireless link.

The signal interface may further comprise a receiver for receiving a second electromagnetic signal, and the human interface device may further comprise a transmitter for sending the second electromagnetic signal to the signal interface.

Thus signals, such as control signals may be sent conveniently from the human operator to the surveillance device. For instance, where the surveillance device is a video camera, the operator may issue a command for the video camera to start recording, or stop recording.

The housing may be man-portable and comprise a grip.

As such, the apparatus can more conveniently be used manually. In general, the apparatus may be a handheld apparatus.

The tape may be at least 30 mm wide, have a camber radius of 15-25 mm, and a thickness of 0.3-0.5 mm.

As such, the tape is able to vertically support a device (e.g. camera) weighing approximately 1 Kg to a distance of up to approximately 3 m.

The retractable support member may be provided with a low observable finish.

Such provision can tend to mitigate the risk of detection and so provide a support suited for covert operations. For example, the support member may be finished in a matt black paint and thereby mitigate the risk of glint.

The transmitter (which my alternatively or additionally function as a receiver) at the surveillance device may further comprise an antenna arranged along a portion of the tape, and wherein the antenna is substantially planar and sufficiently flexible to be mounted on the tape to conform to the tape in both the coiled condition and the extended condition.

The receiver (which my alternatively or additionally function as a transmitter) at the human interface may further comprise an antenna arranged along a portion of the tape, and wherein the antenna is substantially planar and sufficiently flexible to be mounted on the tape to conform to the tape in both the coiled condition and the extended condition.

The surveillance device may further comprise an on-board power source.

The surveillance device may comprise a releasable fastening whereby the device can be releasably fastened to the mount.

So that the invention may be well understood, at least one exemplary embodiment shall now be described with reference to the following figures, of which:

Figure 1:
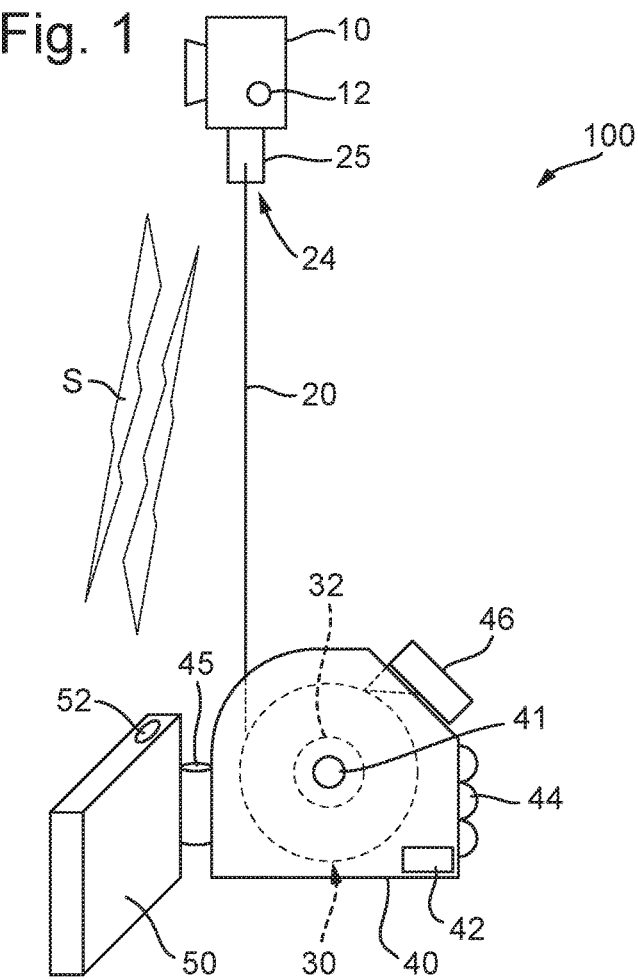
FIG. 1 shows a first surveillance apparatus according to the present invention.

Referring to FIG. 1 there is shown generally at 100 a surveillance apparatus.

The surveillance apparatus 100 comprises a surveillance device 10, attached by way of a mount 25 to a first, or distal, end 24 of a retractable support member 20. The retractable support member 20 extends away from the surveillance device 10 into a rotatable spooling mechanism 30. The mechanism 30 is accommodated in a housing 40.

The retractable support member 20 is generally rigid but may readily be collapsed by the application of a suitable force.

Figure 2:
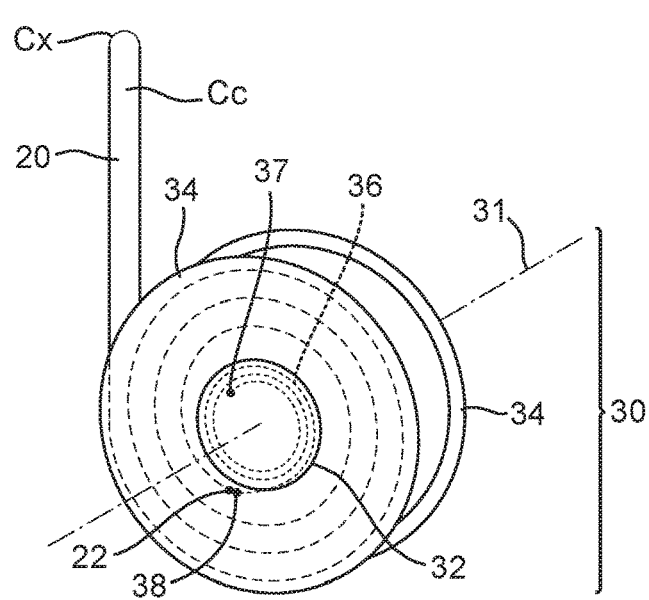
FIG. 2 shows a three dimensional representation of a spooling mechanism as may be provided within the first surveillance apparatus of FIG. 1.

More specifically, the support 20 is generally in the form of a cambered metallic tape. Thus the tape has a convex Cx and a concave Cc surface, as shown in FIG. 2. When in an extended condition, the tape 20 may be readily collapsed by applying a positive bending moment over the length of the tape (i.e. the bending moment tends to compress the concave surface and stretch the convex surface) and subsequently coiling the tape 20.

The tape of the present embodiment is made from steel and has a thickness of 0.4 mm, a width of 32 mm and a camber radius of 20 mm.

The applicant has determined that, surprisingly, when such a tape 20 is provided in an extended condition it can be sufficiently rigid to support not only the mass of its extended portion but also the mass of the surveillance device 10.

Indeed, the applicant has ascertained that, surprisingly, for a surveillance device 10 of approximate mass 820 g (including a 65 g battery power supply), using the tape 20 of the present embodiment, a tape length of 3 m may exist in the extended condition and feasibly support the surveillance device 10.

Thus, in the present embodiments, the tape 20 may be 3 m long.

Such a tape 20 may alternatively be provided in a coiled condition (or a 'reeled-in' condition) where the tape 20 is wound in a spiral for more convenient stowage.

The tape 20 may exist in a combination of conditions: an outer portion of the tape 20 may be provided in an extended condition and an inner portion of the tape 20 may be in a coiled condition.

The camber of the tape 20 is arranged such that as the tape 20 is coiled, or reeled in, the concave surface Cc of the tape 20 tends to be laid on top of the convex Cx surface of the tape 20.

With further reference to FIG. 2, the rotatable spooling mechanism 30 comprises a rotatable drum, rotatably mounted on an axle 41 within the housing 40. The drum is in the form of a reel or spool and comprises a generally hollow cylinder 32 (the axis 31 of which being coaxial with the axis of rotation of the drum) extending between flanking annular flanges 34. Within the hollow cylinder 32 there is a coil spring 36, formed from a strip of metal, which is at its innermost end 37 fixed to the housing 40. The coil spring 36 is wound around itself such that it spirals out from the innermost end 37, extending in a clockwise direction. The outermost end 38 of the coil spring 36 extends through an aperture in the cylinder 32 and is attached to the innermost end 22 of the tape 20.

Thus the innermost end 22 of the tape 20 is held close to the outer surface of the cylinder 32 and the concave surface Cc of the tape 20 faces the outer surface of the cylinder 32. From the innermost end 22 of the tape 20, the tape 20 extends in a clockwise manner, overlapping itself to form a spiral about the cylinder 32 and ultimately terminating at the distal end 24 of the tape 20.

The coil spring 36 is biased to urge the outermost end 38 of the coil spring 36 back into the interior of the drum 32. Consequently the cylinder 32 is biased to rotate relative to the housing in an anticlockwise direction to reel in the tape 20.

Furthermore, the biasing of the spring 36 and the interconnection between the spring's distal end 38 and the tape's inner end 22 tend to provide that the interconnection is in a substantially fixed location, relative to the cylinder 32.

A brake 46 is provided which may be applied, by sliding into contact with the mechanism 30, so as to arrest the rotation of the drum and lock the amount of tape 20 paid out from the spooling mechanism 30.

The spooling mechanism 30 is held within the chamber of the housing 40 such that it is able to rotate relative to the housing 40. The housing 40 is provided with an aperture to allow the retractable member, tape 20, to extend out from the general bounds of the housing 40.

A human interface device 50, which in the present invention is a display screen 50, is attached to the housing 40 by hinge 45. The axis of the hinge 45 is oriented such that the display screen 50 may in one condition be folded into the main body of the housing 40 for secure stowage, or in another condition flipped out from the housing 40 for ease of viewing by an operator.

The hinge 45 may be provided with a further pivot (not shown), having an axis normal to that of the hinge 45 such that the screen 50 may be tilted for even further ease of viewing by an operator.

The housing 40 is further provided with a power supply 42 for providing power to electrical components at the housing 40, and a grip 44 for facilitating handheld operation of the apparatus.

In the first surveillance apparatus presently embodied, the surveillance device 10 is a video camera.

Further, surveillance device 10 is provided with an interface 12 for a wireless link S and is thereby capable of transmitting and/or receiving electromagnetic signals. In association with the interface 12, the display screen 50 is provided with an interface 52 for the wireless link S and as such, images captured at the camera 10 may be relayed to the display screen 50 and shown thereon.

The interfaces 12 and 52 may comprise an antenna and transceiver unit. Thus the wireless link S may adopt RF transmission protocols included in or associated with BLUETOOTH® technology (including in particular the IEEE standard 802.15.1) or included in or associated with the IEEE 802.11 standards (referred to commonly as WIFI®). IEEE 802.11 standards would tend to be suited to relaying high definition video signals.

Still further, the wireless link S may be operable at frequencies in the range of 55-65 GHz and thereby enable high data rates and covert signal distribution (this band being strongly attenuated by air).

Where the interface comprises an antenna, the antenna may be a flexible planar antenna laid up on the tape 20 (such that the antenna is conformal with the tape), and suitably insulated therefrom. Such a flexible planar antenna could be bonded or printed onto the tape 20. Such a flexible planar antenna should tend to roll up with the tape 20 as the tape 20 is stowed.

Alternatively, and in contexts where overt operation is permissible, the interface 12 may comprise a light beacon, a photo-detector and a transceiver unit. Thus the wireless link S may be provided with a free space optical signal transmission protocol.

Figure 3:
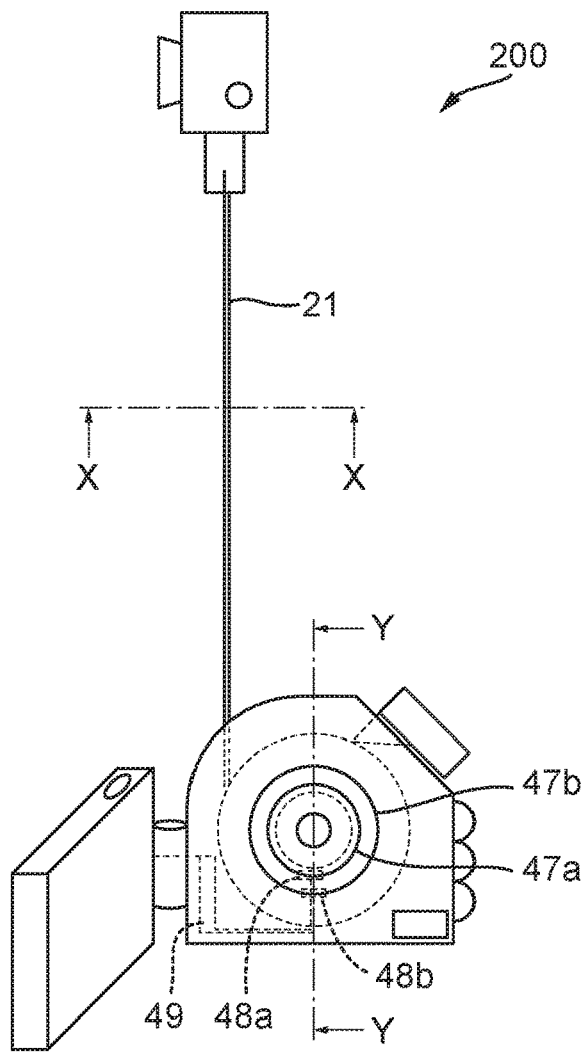
FIG. 3 shows a second surveillance apparatus according to the present invention.
Figure 4:
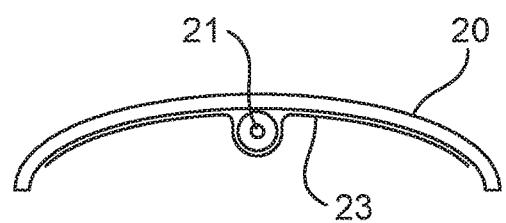
FIG. 4 shows a cross-section through the line X-X from FIG. 3.
Figure 5:
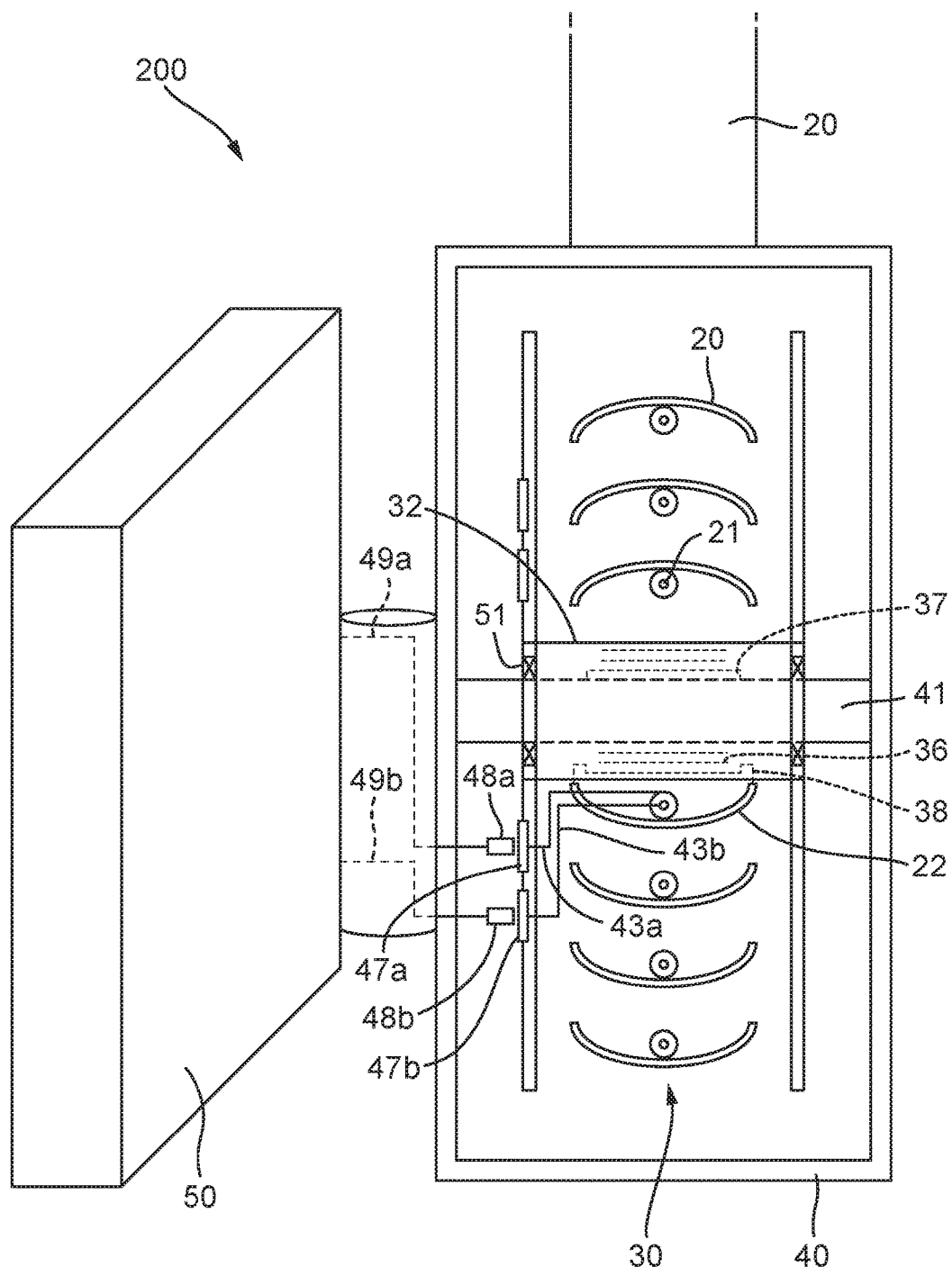
FIG. 5 shows a cross-section through the line Y-Y from FIG. 3.

Referring to FIGS. 3, 4 and 5, a surveillance device according to the second embodiment of the present invention is shown generally at 200.

The surveillance device 200 is similar to the first embodiment shown in FIG. 1. Consequently, for simplicity, where components are repeated such that reference numerals would be the same, these reference numerals have been omitted from FIG. 3 for clarity.

The surveillance apparatus 200 differs from the first embodiment in providing an alternative means for relaying signals (e.g. conveying data) from the surveillance device 10 (e.g. camera) to the human interface 50 (e.g. display screen).

In particular and referring to FIGS. 4 and 5, the apparatus 200 provides a continuous electrical connection between the device 10 and the display 50.

This continuous connection comprises a coaxial cable 21 bonded to the tape 20 and thereby extending between the camera 10 and the housing 40.

The coaxial cable 21 is bonded to the tape 20 using a thin single-sided adhesive strip 23 (omitted from FIG. 5 for visual clarity) running along the tape 20.

The coaxial cable 21 and adhesive strip 23 are selected to be sufficiently fine (i.e. having low profile) that they do not significantly impede the spooling mechanism 30, given that approximately 3 m of tape (or more) may be coiled in the mechanism 30.

The applicant has identified '38 AWG 50 Ohm Coaxial Cable' as supplied by ADS Europe Ltd (ADS Europe Ltd, Clay House Business Centre, 5 Horninglow St, Burton-on-trent, DE14 1NG; info@adseuropeltd.com) as being suitable for this purpose.

More specifically the adhesive strip is a transparent adhesive laminate tape with a thickness of 0.05 mm and cut to the width and length of the tape 20

As shown in FIGS. 3 and 5, the surveillance apparatus 200 is provided with a rotary electrical joint, between the cylinder 32 and the housing 40 such that the signal carried over the coaxial cable 24 may be communicated onward to the display screen 50.

The rotary electrical joint comprises annular tracks 47a and 47b on the outer surface of one of the flanges 34. These are electrically connected to the innermost end of the coaxial cable 21. More specifically: wire 43a connects the outer conductor of the cable 21 to the circular track 47a; and wire 43b connects the inner conductor of the cable 21 to the circular track 47b. (Wires 43a and 43b are omitted from FIG. 3 for visual clarity).

The wires 43a and 43b are physically routed within the mechanism 30 such that, with the exception of the innermost end 22 of the tape 20, they are secured away from the tape 20, and away from the coil spring 36. As such, the wires do not tangle with or otherwise contact these as the tape 20 pays out or reels in. Nonetheless, the wires are physically routed such that there is sufficient slack in them, particularly, where they contact the innermost end 22 so as to be able to accommodate shifts in the position of the innermost end 22 relative to the drum cylinder 32. However, the spring 37 of the spooling mechanism 30 is calibrated such that the innermost end 22 is substantially fixed relative to the cylinder 32; shifts in position should tend to be minimised.

The housing 40, at the chamber that accommodates the spooling mechanism 30 is provided with sprung contacts 48a and 48b which are biased to touch their respective tracks 47a and 47b and thereby maintain contact as the spooling mechanism 30 rotates. The sprung contacts 48a, 48b, are electrically connected to wires 49a and 49b which feed an input signal into the display screen 50.

Thus the wires 43, the annular tracks 47 and the contacts 48 provide the rotary electrical joint and contribute to the continuous electrical connection between the device 10 and the human interface 50.

Also shown clearly in FIG. 5, is an axle 41 which is fixed to and forms part of the housing 40. The axle 41 protrudes through and supports the cylinder 32 of the spooling mechanism 30. Such support is provided at a low friction cylindrical interface 51 which facilitates the rotation of the spooling mechanism 30 about axis 31. In the present embodiment, the axle 41 is the part of the housing 40 to which the innermost end 37 of the spring 36 connects.

Figure 6A:
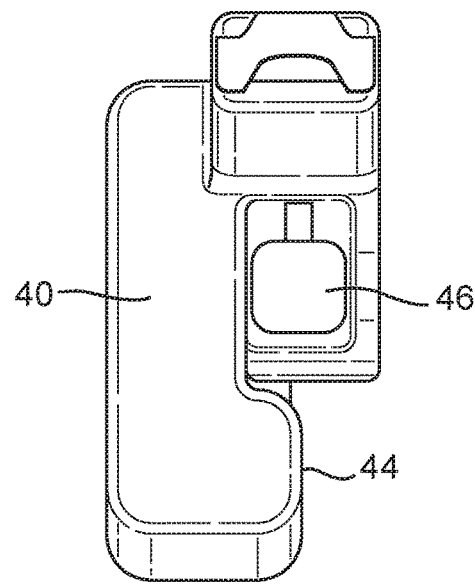
FIGS. 6A and 6B show a three-dimensional representation of a partially assembled surveillance apparatus, where the retractable support member is in various states of extension.

In operation, the apparatus 100 or 200 may be in a collapsed condition where the tape 20 is fully retracted into the spooling mechanism, as shown in FIG. 6A, so as to minimise the space the apparatus occupies.

Thus, when the camera 10 is not in use, the apparatus can be readily stashed in a pocket or backpack.

Alternatively, the apparatus 100 or 200 may be in an extended condition where the device 10 is remote to at least some degree from the human interface 50, as compared to when the apparatus is in the retracted condition and signals are being communicated therebetween. It is also noted that the camera may be activated and the apparatus generally in use, but without the need for the tape 20 to be extended and provide a different/displaced viewpoint.

Figure 6B:
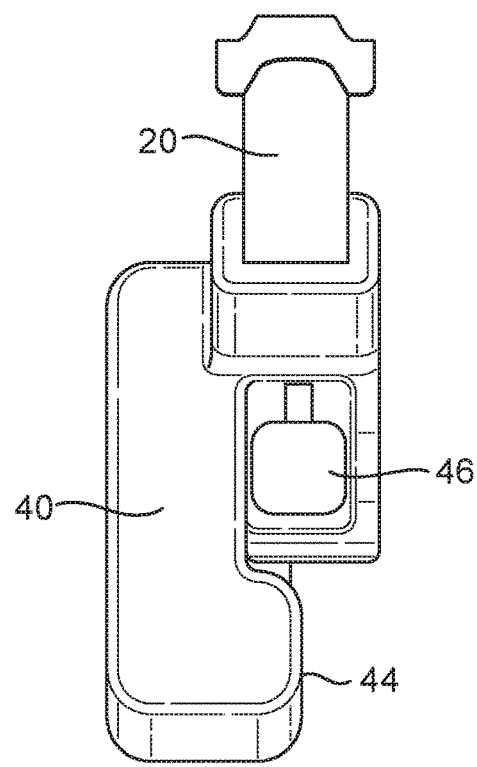

The apparatus 100 or 200 may readily be converted from such a storage condition into an extended condition, such as shown in FIGS. 1, 3, and 6B.

To effect such a conversion, the operator may simply disengage the brake 46 (if it is engaged) and then manually pay out the tape 20 to gradually displace the camera 10 from the housing 40.

As the tape is paid out, the operator overcomes the urging force of the spring 36 and causes the spooling mechanism 30 to rotate relative to the housing 40.

Once a desired displacement (e.g. height) of the camera has been achieved, the brake 46 may be reapplied in order to hold the camera 10 steady at that displacement and with the desired amount of tape in the extended condition.

Consequently, with the camera and screen activated the operator may survey a scene by monitoring environmental signals from a viewpoint that could otherwise be unachievable. For example the apparatus 100, 200 may be extended in order to see over a wall or other obstacle.

Further, the apparatus 100, 200 may readily be converted from such an extended condition back to the storage condition by releasing the brake 46 and allowing the spring 36 to rotate the spooling mechanism 30 and thereby draw the tape 20 back into its coiled condition.

Variants of the present invention may provide one or more of the following in combination or as an alternative to equivalents mentioned above.

For instance, the human interface 50 may be a simple control panel for issuing blind instructions to the surveillance device 10. For example, the control panel may be operable to issue a signal to the device 10 so as to start recording (where the device 10 is a video camera), or to capture and image (where the device 10 is a stills camera). Such a control panel may be suited to interfacing with the device 10 by means of a BLUETOOTH® scheme.

The mount 25 may be provided in an articulated form, such that it may swivel and tilt. Such articulation may be passive so that the operator determines and applies the swivel and tilt whilst proximate to the device 10. Alternatively, the mount may be active such that in response to signals issued via the interface 50, the operator is able to swivel or tilt the device 10 e.g. to vary the field of view.

The surveillance device has been embodied above as a camera or video camera. In further embodiments within the scope of the present invention the device 10 may alternatively or additionally be capable of monitoring other environmental signals. The device may therefore comprise a microphone or a thermometer, or a magnetometer, or other sensor.

In embodiments such as the first embodiment 100 where a wireless data link is provided between the surveillance device 10 and the housing 40/human interface device 50, the surveillance device 10 may be provided with an on board power supply, such as a battery and/or solar panel. As such, and particularly where there is a releasable fastening at the mount 25, there is facilitated an arrangement where a surveillance device can be conveniently swapped for a replacement or alternative surveillance device.

Furthermore, the provision of the detachable device 10 with on-board power supply enables a further mode of operation whereby the device 10 may be detached from the tape mount 25, deployed elsewhere and then, provided the wireless data link range is not exceeded, relay signals to the housing unit 40 and human interface device 50.

In variants, the housing 40 may be provided with a motor or other actuator means for automatically reeling in or paying out of the tape 20. This provision would tend to enable one handed operation of the apparatus.

The invention claimed is:

1. A surveillance apparatus comprising:
   a cambered tape having a first end and a second end;
   a housing;
   a spooling mechanism mounted at the housing, and being rotatable relative to the housing, and being attached to the second end of the cambered tape, the spooling mechanism being:
   operable to rotate in a first direction to convert the cambered tape from a coiled condition to an extended condition and thereby pay-out a support member from the housing, and
   operable to rotate in a second direction opposite to the first to convert the cambered tape from the extended condition to the coiled condition and thereby retract the support member into the housing;
   a mount attached to the first end of the cambered tape;
   a surveillance device attached to the mount for receiving environmental signals;
   a human interface remote from the surveillance device and including a receiver for receiving electromagnetic signals; and
   a signal interface for relaying the environmental signals received at the surveillance device to the human interface, wherein the signal interface includes a transmitter for sending a first electromagnetic signal to the receiver of the human interface, wherein the transmitter of the signal interface further comprises an antenna arranged along a portion of the tape, and wherein the antenna is substantially planar and sufficiently flexible to be mounted on the tape to conform to the tape in both the coiled condition and the extended condition;
   wherein the surveillance device may be supported, remote from the human interface by paying out the member.

2. The surveillance apparatus according to claim 1 wherein the spooling mechanism comprises a spring biased to retract the support member, and wherein the surveillance apparatus further comprises a selectively applicable brake for locking the member in position when a desired amount of the cambered tape has been extended.

3. The surveillance apparatus according to claim 1 wherein the human interface is at the housing.

4. The surveillance apparatus according to claim 1 wherein the surveillance device is a camera, and the human interface is a display screen.

5. The surveillance apparatus according to claim 1 wherein the human interface comprises a display screen, and the display screen is pivotally attached at the housing in at least one axis, such that the display screen may switch between a readily observable condition and a stowed condition.

6. The surveillance apparatus according to claim 1 wherein the first electromagnetic signal is a radio frequency signal having a frequency between 55 GHz and 65 GHz.

7. The surveillance apparatus according to claim 1 wherein the signal interface further comprises a receiver for receiving a second electromagnetic signal, and wherein the human interface comprises a transmitter for sending the second electromagnetic signal to the receiver of the signal interface.

8. The surveillance apparatus according to claim 1 wherein the housing is portable and comprises a grip.

9. The surveillance apparatus according to claim 1 wherein the tape is at least 30 mm wide, has a camber radius of 15-25 mm, and a thickness of 0.3-0.5 mm.

10. The surveillance apparatus according to claim 1 wherein the cambered tape is provided with a low observable finish.

11. The surveillance apparatus according to claim 1 wherein the receiver of the human interface further comprises an antenna arranged along a portion of the tape, and wherein the antenna is substantially planar and sufficiently flexible to be mounted on the tape to conform to the tape in both the coiled condition and the extended condition.

12. The surveillance apparatus according to claim 1 wherein the surveillance device further comprises an on-board power source.

13. The surveillance apparatus according to claim 1 wherein the surveillance device comprises a releasable fastening whereby the surveillance device is releasably fastened to the mount.

14. A surveillance apparatus comprising:
   a cambered tape having a first end and a second end;
   a surveillance device releasably coupled to the first end of the cambered tape, for receiving one or more environment signals;
   a spooling mechanism attached to the second end of the cambered tape, the spooling mechanism being operable to:
   rotate in a first direction to convert the cambered tape from a coiled condition to an extended condition, to extend a support member to a deployed position thereby deploying the surveillance device, and
   rotate in a second direction opposite to the first to convert a retractable support member from the extended condition to the coiled condition, to retract the support member to a stowed position thereby stowing the surveillance device;

a human interface remote from the surveillance device and including a transceiver and antenna arrangement for sending and receiving electromagnetic signals; and a signal interface for relaying the environmental signals received at the surveillance device to the human interface, wherein the signal interface includes a transmitter for sending a first electromagnetic signal to the transceiver of the human interface, wherein the transmitter of the signal interface further comprises an antenna arranged along a portion of the tape, and wherein the antenna is substantially planar and sufficiently flexible to be mounted on the tape to conform to the tape in both the coiled condition and the extended condition.

15. The surveillance apparatus according to claim 14 wherein the antenna of the human interface is arranged along a portion of the tape and conforms to the tape in both the coiled condition and the extended condition.

16. The surveillance apparatus according to claim 14 wherein the transmitter of the signal interface further comprises an antenna arranged along a portion of the tape, and conforms to the tape in both the coiled condition and the extended condition.

17. The surveillance apparatus according to claim 14 wherein the signal interface further comprises a receiver for receiving a second electromagnetic signal, and wherein the transceiver of the human interface sends the second electromagnetic signal to the receiver of the signal interface.

18. A surveillance apparatus comprising:
    a cambered tape having a first end and a second end;
    a housing;
    a spooling mechanism mounted at the housing, and being rotatable relative to the housing, and being attached to the second end of the cambered tape, the spooling mechanism being:
    operable to rotate in a first direction to convert the cambered tape from a coiled condition to an extended condition and thereby pay-out a support member from the housing, and
    operable to rotate in a second direction opposite to the first to convert the cambered tape from the extended condition to the coiled condition and thereby retract the support member into the housing;
    a mount attached to the first end of the cambered tape;
    a surveillance device attached to the mount for receiving environmental signals;
    a human interface remote from the surveillance device and including a receiver for receiving electromagnetic signals, wherein the receiver of the human interface further comprises an antenna arranged along a portion of the tape, and wherein the antenna is substantially planar and sufficiently flexible to be mounted on the tape to conform to the tape in both the coiled condition and the extended condition; and
    a signal interface for relaying the environmental signals received at the surveillance device to the human interface, wherein the signal interface includes a transmitter for sending a first electromagnetic signal to the receiver of the human interface;
    wherein the surveillance device may be supported, remote from the human interface by paying out the member.

19. The surveillance apparatus of claim 18, wherein the transmitter of the signal interface further comprises an antenna arranged along a portion of the tape, and wherein the antenna is substantially planar and sufficiently flexible to be mounted on the tape to conform to the tape in both the coiled condition and the extended condition.

20. The surveillance apparatus of claim 18, wherein the tape is at least 30 mm wide, has a camber radius of 15-25 mm, and a thickness of 0.3-0.5 mm.

* * * * *